(12) United States Patent
Nitta et al.

(10) Patent No.: US 6,304,329 B1
(45) Date of Patent: Oct. 16, 2001

(54) GYRO AND SEMICONDUCTOR DEVICE HAVING A PLURALITY OF LASER DIODES

(75) Inventors: Jun Nitta; Takahiro Numai, both of Ninomiya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,779

(22) Filed: Oct. 18, 1999

(30) Foreign Application Priority Data

Oct. 19, 1998 (JP) .................................................. 10-296578

(51) Int. Cl.$^7$ .................................................. G01C 19/66
(52) U.S. Cl. .................................................. 356/459
(58) Field of Search .................. 356/459, 461; 372/94

(56) References Cited

U.S. PATENT DOCUMENTS

| | | | |
|---|---|---|---|
| 4,327,962 | * 5/1982 | Redman | 356/361 |
| 4,431,308 | 2/1984 | Mitsuhashi et al. | 356/459 |
| 4,913,548 | 4/1990 | Vick | 356/459 |

FOREIGN PATENT DOCUMENTS

| | | |
|---|---|---|
| 62-39836 | 8/1987 | (JP) . |
| 4-174317 | 6/1992 | (JP) . |
| 5-288556 | 11/1993 | (JP) . |
| 6-38529 | 5/1994 | (JP) . |

* cited by examiner

*Primary Examiner*—Samuel A. Turner
(74) *Attorney, Agent, or Firm*—Fitzpatrick, Cella, Harper & Scinto

(57) ABSTRACT

In a gyro which has a ring resonator type laser diode, and which detects a beat signal attendant on rotation, a plurality of laser diodes are disposed on an identical substrate, thereby to exhibit a wide detection range for angular velocities. In the gyro, active layers of the laser diodes may be arranged separately from one another. A semiconductor device includes a plurality of ring resonator type laser diodes, each of which undergoes a voltage change or a change in a driving current in attendance on a magnitude of an applied angular velocity when subjected to constant-current drive, and which are disposed in a single frame or on a single substrate. In the semiconductor device, the ring resonator type laser diodes may be disposed on an identical surface of the single substrate.

27 Claims, 7 Drawing Sheets

GYRO AND SEMICONDUCTOR DEVICE HAVING A PLURALITY OF LASER DIODES

BACKGROUND OF THE INVENTION

1. Field of the Invention

The present invention relates to gyros. More particularly, it relates to an optical gyro whose detection range for angular velocities is wide. Further, it relates to a semiconductor device which has a laser diode of a ring resonator type.

2. Related Background Art

Heretofore, a mechanical gyro having a rotor or a vibrator, and an optical gyro have been known as gyros each of which is used for detecting the angular velocity of a moving object. In particular, the optical gyro is capable of instantaneous start and has a wide dynamic range, and it is therefore innovating in the field of gyro technology. Such optical gyros include a laser gyro of ring resonator type, an optical fiber gyro, a gyro of passive ring resonator type, etc. Among them, a ring resonator type laser gyro employing a gas laser was begun to be developed earliest, and it has already been put to practical use for aircraft etc. Recently, a ring resonator type laser gyro of small size and high precision has also been proposed, and one disclosed in the official gazette of Japanese Patent Application Laid-open No. 5-288556 is mentioned as an example. With such an optical gyro, a semiconductor ring resonator type laser is formed on a single substrate, clockwise and counterclockwise lights outputted from a ring waveguide are detected by a single photodetector outside a ring resonator, and the beat signal of the lights is detected, thereby to detect an angular velocity.

FIG. 15 of the accompanying drawings is a top plan view of the ring resonator type laser gyro contained in the official gazette of Japanese Patent Application Laid-open No. 5-288556. Numeral 110 designates a semiconductor substrate, numeral 111 a gain waveguide, numeral 112 reflective surfaces, numerals 113 and 114 output surfaces, numerals 118 and 119 lights delivered from the respective output surfaces 113 and 114, numeral 117 a photodetector, and numerals 122 and 123 electrodes. In case of the gyro shown in FIG. 15, lasing lights are generated in the gain waveguide 111 having the reflective surfaces 112, by injecting a current. The wavelengths of the clockwise light 115 and the counterclockwise light 116 differ in accordance with an angular velocity, and the two output lights 118 and 119 (corresponding to the clockwise and counterclockwise lights 115 and 116, respectively) interfere on the photodetector 117. Thus, the angular velocity is outputted as a voltage change from the electrode 123.

With the prior-art example, however, the size of the laser gyro becomes large for the reason that a beat signal is detected by deriving the clockwise light and counterclockwise light which travel within the ring waveguide, and causing the lights to interfere on the photodetector. Further, a gyro of higher detection sensitivity or wider detection range for angular velocities has been requested.

SUMMARY OF THE INVENTION

The present invention has for its object to provide a gyro which has a wide detection range for angular velocities.

Another object of the present invention is to provide a gyro which has a high reliability for angular velocity detection, and which can be reduced in size.

According to the present invention, in a gyro which has a ring resonator type laser diode, and which detects a beat signal attendant on rotation, a gyro is characterized in that plural laser diodes are provided on an identical substrate.

Further, a gyro according to the present invention is characterized in that active layers of the laser diodes are arranged separately from one another.

Further, the present invention is characterized in that the sizes of the plurality of laser diodes comprises 2 sizes or more; and that the plurality of compositions of the active layers comprised in the laser diodes consists of two or more sorts of composition.

A gyro according to the present invention is characterized in that the plurality of laser diodes are formed on an identical surface of the identical substrate.

Also, the present invention is characterized in that the beat signal is detected as a change in a voltage developing across each of the laser diodes, a change in a current flowing through each laser diode, or a change in the impedance of each laser diode. More concretely speaking, the beat signal is detected as a change of frequency in the voltage, a change of frequency in the current flowing, or a change of frequency in the impedance.

A semiconductor device according to the present invention is characterized in that plural ring resonator type laser diodes, each of which undergoes a voltage change across predetermined terminals in attendance on the magnitude of an applied angular velocity when subjected to constant-current drive, are disposed in a single frame.

Also, a semiconductor device according to the present invention is characterized in that plural ring resonator type laser diodes, each of which undergoes a change in a driving current in attendance on the magnitude of an applied angular velocity when subjected to constant-voltage drive, are disposed in a single frame.

Further, a semiconductor device according to the present invention is characterized in that plural ring resonator type laser diodes, each of which undergoes a voltage change across predetermined terminals in attendance on the magnitude of an applied angular velocity when subjected to constant-current drive, are disposed on a single substrate.

Besides, a semiconductor device according to the present invention is characterized in that plural ring resonator type laser diodes, each of which undergoes a change in a driving current in attendance on the magnitude of an applied angular velocity when subjected to constant-voltage drive, are disposed on a single substrate.

With the gyro in which the plurality of ring resonator type laser diodes are disposed on the single substrate as in the present invention, the angular-velocity detection sensitivities of the respective laser diodes can be made different, and hence, an optical gyro whose detection range for angular velocities is wider than in the prior art can be provided.

DESCRIPTION OF THE PREFERRED EMBODIMENTS

Now, the constructions and operations of gyros according to the present invention will be described with reference to the drawings.

EMBODIMENT 1

Figure 1:
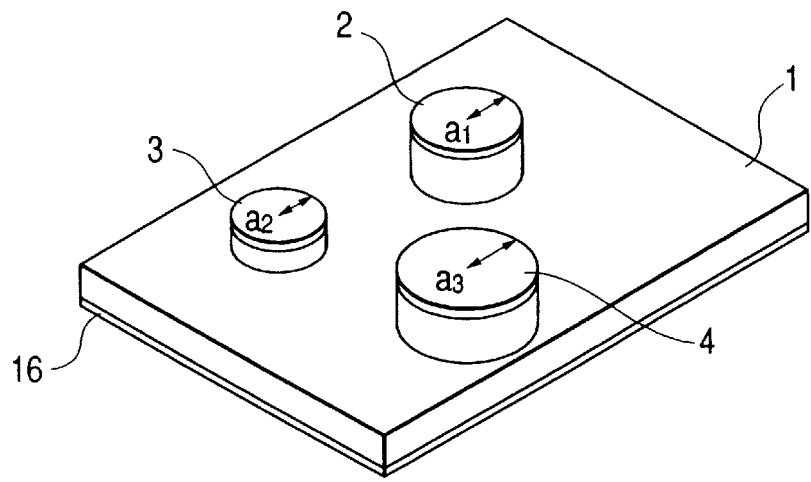
FIG. 1 is a perspective view showing an example of elements which constitute a gyro according to the present invention.

FIG. 1 is a perspective view showing an example of elements which constitute gyro according to the present invention. It illustrates a case where plural ring resonator type laser diodes are disposed on a single substrate. Referring to FIG. 1, numeral 1 designates the semiconductor substrate. Numerals 2, 3 and 4 designate first, second and third laser diodes of ring resonator type which are formed on the front surface side of the semiconductor substrate 1 and which have different radii (indicated by $a_i$ in the figure), respectively. Here, the different radii of the first ring resonator type laser diode 2, second ring resonator type laser diode 3 and third ring resonator type laser diode 4 are denoted by symbols $a_1$, $a_2$ and $a_3$, respectively. Numeral 16 indicates a first electrode which is provided on the rear surface side of the semiconductor substrate 1. Of course, all of the radii $a_1$, $a_2$ and $a_3$ may well be equal, or at least two values may well be coexistent as these radii. Besides, although the three laser diodes 2 to 4 are shown in FIG. 1, the number of laser diodes may well be two or at least four.

Figure 2:
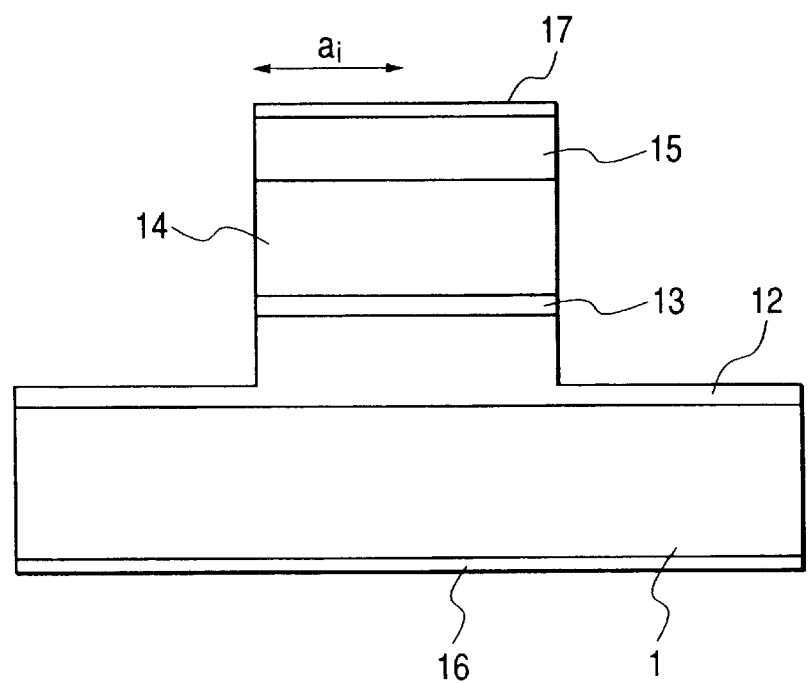
FIG. 2 is a schematic sectional view for explaining an example of the layer configuration of each of the ring resonator type laser diodes shown in FIG. 1.

FIG. 2 is a schematic sectional view for explaining an example of the layer configuration of each of the ring resonator type laser diodes shown in FIG. 1. It illustrates a case where all the ring resonator type laser diodes 2, 3 and 4 shown in FIG. 1 are formed by the same layer configuration. That is, the layer configuration shown in FIG. 2 is the construction of each of the first, second and third ring resonator type laser diodes 2, 3 and 4. Symbol $a_i$ in FIG. 2 denotes the radius $a_1$ or $a_2$ or $a_3$ of the corresponding laser diode shown in FIG. 1. Referring to FIG. 2, numeral 1 designates the semiconductor substrate whose front surface is overlaid with a buffer layer (serving also as a clad layer) 12, an active layer 13, a first clad layer 14, and a cap layer 15. The first electrode 16 is formed on the rear surface of the semiconductor substrate 1, while a second electrode 17 is formed on the cap layer 15.

By the way, in the case where the plurality of laser diodes are formed on the identical substrate as depicted in FIG. 1, a manufacturing process for the optical gyro can be simplified. Especially in this embodiment, the laser diodes are formed on the identical surface of the identical substrate, so that the manufacturing process can be more simplified.

Figure 3:
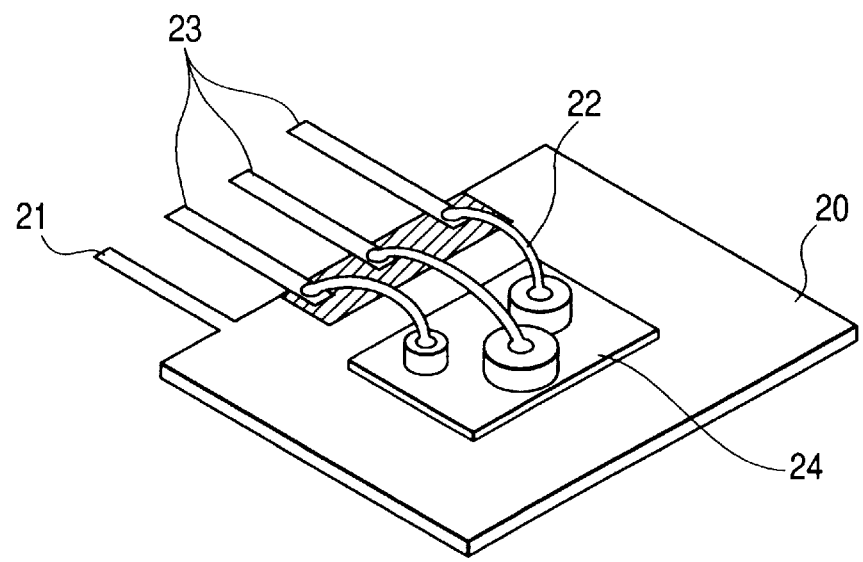
FIG. 3 is a perspective view showing an example of a gyro which employs the elements shown in FIG. 1.

FIG. 3 is a perspective view showing an example of gyro which employs the device shown in FIG. 1. In employing the device constructed as stated above, the injection of a current or the application of a voltage is indispensable, and hence, a construction illustrated in FIG. 3 by way of example is required. A case where the device is operated by constant-current drive, will be chiefly explained below.

Referring to FIG. 3, numeral 20 designates a stem which is a bed plate for mounting the ring resonator type laser (laser diodes shown in FIG. 1) 24, and with which a common electrode 21 is electrically connected. Electrodes 23 correspond to the respective elements or diodes of the ring resonator type laser 24, and they are connected with the corresponding diodes by pieces of wire 22.

Figure 4:
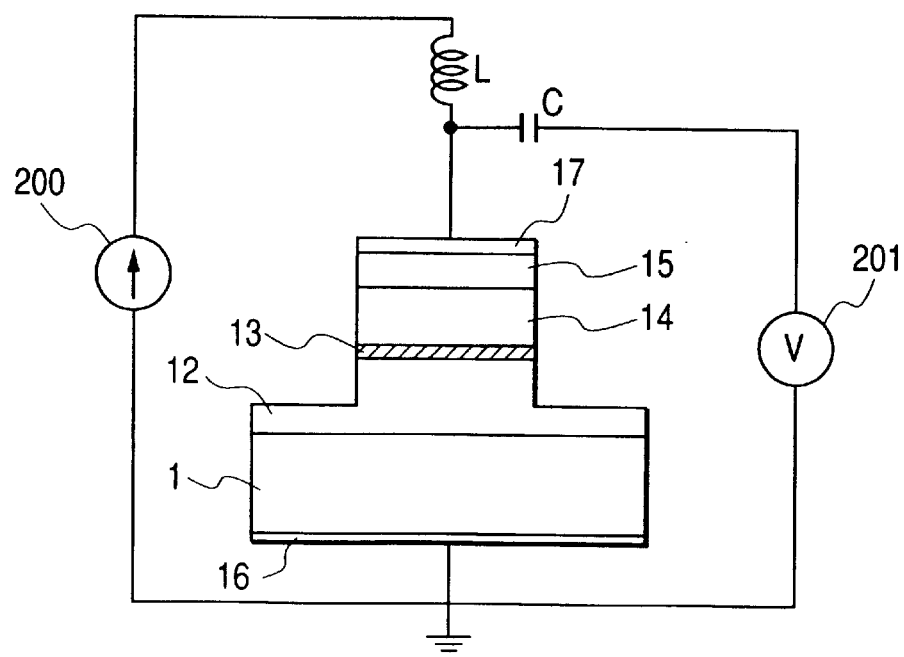
FIG. 4 is a diagram showing a circuit which includes a capacitor and an inductance, and which is employed in order to implement the injection of a current and the detection of a voltage by the same electrodes.

The substrate side of the ring resonator type laser 24 is bonded onto the stem 20 as a common electrode by a solder, and the electrodes of the cap layer side of the laser 24 are connected to the corresponding electrodes 23 by the wire pieces 22. With the construction shown in FIG. 3, currents can be caused to flow through the elements or diodes. While the current is being injected into each of the ring resonator type laser diodes, a change in the terminal voltage between the first electrode 16 and second electrode 17 of the laser diode is detected. Besides, a circuit arrangement which includes a capacitor C and an inductance L as illustrated in FIG. 4 is employed in order to implement the injection of the current and the detection of the voltage by the same electrodes. Of course, insofar as the detection of the voltage is possible, a detection circuit is not restricted to the illustrated circuit arrangement. In FIG. 4, only electrical connections to the element are shown by omitting the stem 20, the wire piece 22, etc. shown in FIG. 3. Owing to such an arrangement, the current can be injected from a current source 200 through the inductance L, and the change in the voltage between the first electrode 16 and the second electrode 17 can be detected by voltage detection means 201 through the capacitor C.

Moreover, since the means for detecting the voltage change while injecting the current into the ring resonator type laser diode is included in the above arrangement, the voltage change detection means can offer terminals for monitoring the voltage change, and hence, a processing circuit for a detection signal can be readily connected to the monitor terminals. Of course, the voltage change detection means may well be individually connected to the plurality of ring resonator type laser diodes.

A practicable operation will be explained below.

In the ring resonator type laser diode, lights are confined within the active layer 13 and revolve round while repeating total reflections from a wall surface (in this embodiment, the side surface of a circular cylinder). A wavelength at which the phasic conditions of the lights agree when the lights have made one round and which lies within the gain band of the active layer 13 (a wavelength range in which amplification is exhibited upon the injection of the current into the active layer 13), leads to lasing by the current injection. In the laser diode, the lights are propagating circularly in opposite directions to each other. That is, the lights are revolving round clockwise and counterclockwise within the active layer 13 (of disc shape). When a rotational motion (an angular velocity Ω (rad/s)) within a horizontal plane acts on a p-n junction, optical path lengths which the counterclockwise light and the clockwise light sense change, and the wavelengths (frequencies) of the counterclockwise and the clockwise lights change accordingly. Concretely, when subjected to a clockwise rotational motion, the wavelength of the clockwise light lengthens, and the wavelength of the counterclockwise light shortens contrariwise.

More specifically, in each of the ring resonator type laser diodes in this embodiment, the voltage which appears between the first electrode 16 and the second electrode 17 fluctuates at a beat frequency (Δω) expressed by the following formula, in accordance with the angular velocity Ω (rad/s).

$$\Delta\omega_i = (2\pi a_i/\lambda_i)\Omega$$

Here, the parameter i=1, 2 and 3. In detecting the voltage change, a constant-current injecting operation is performed lest any voltage change should be detected when the angular velocity Ω is zero. In the case where the three ring resonator type laser diodes are disposed and where the radii $a_i$ of the respective laser diodes are different, also the lasing wavelengths of the respective laser diodes become different. Incidentally, the wavelengths are expressed as $\lambda_i$ in the above formula.

The fluctuations of the voltage changes which are detected on the basis of the identical rotational motion (Ω (rad/s)) are different in the first, second and third ring resonator type laser diodes 2, 3 and 4, respectively.

In principle, one ring resonator type laser diode suffices to detect any change in the angular velocity.

In actuality, however, the frequency component of the voltage change is detected, so that an upper limit and a lower limit are imposed on a detectable angular velocity in dependence on the performance of a detector circuit. As explained above, even for the identical rotational motion, the ring resonator type laser diodes having the different radii ($a_i$) undergo the different frequency changes. Using the ring resonator type laser diodes of the plurality of radii, therefore, an angular velocity range which is wider than in the case of one ring resonator type laser diode can be coped with in the bandwidth of an electric circuit (a portion for detecting the frequency component of a voltage).

Figure 5:
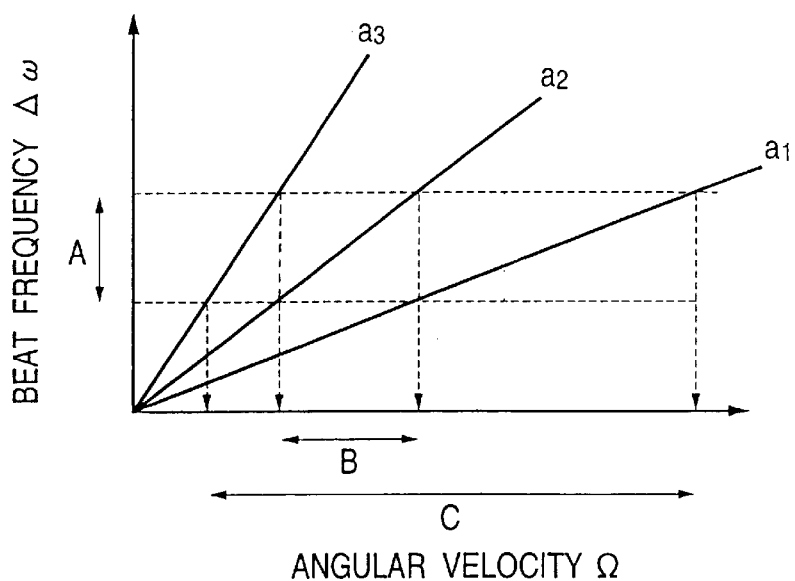
FIG. 5 is a graph showing the relationships between an angular velocity Ω and a beat frequency Δω.

FIG. 5 is a graph showing the relationships between an angular velocity Ω and a beat frequency Δω, and it illustrates the case where the ring resonator type laser diodes have the different radii ($a_i$). As understood from the above formula, the angular velocity Ω and the beat frequency Δω are in a proportional relation. By way of example, letter A denotes a frequency range which is detectable with the detection circuit in case of employing only the ring resonator type laser diode of the radius $a_2$. In this case, only an angular velocity range B indicated in FIG. 5 can be sensed. In contrast, with the gyro having the plurality of ring resonator type laser diodes as in the present invention, an angular velocity range indicated by letter C in FIG. 5 can be sensed. It is therefore permitted to detect the angular velocity range which is wider than in the case of employing only one ring resonator type laser diode.

In this manner, a gyro should desirably be constructed of plural laser diodes which exhibit different rates of changes (different gradients in FIG. 5) in the beat frequency, versus changes in the angular velocity. Such laser diodes of the different gradients are incarnated by making their dimensions different.

The "dimensions" are, for example, the radii of the laser diodes.

Besides, in a case where a gyro includes plural ring resonator type laser diodes having an identical radius, the reliability of angular velocity detection should preferably be enhanced by, for example, averaging the angular velocities detected by the individual laser diodes.

Indeed, even with the identical radius, angular velocity detection in a wide range is realized as in the case of arranging the laser diodes of different radii, in such a way that the laser diodes of identical radius are formed with different sorts of active layers, thereby to make their lasing frequencies different.

Further, when the sorts of the active layers constituting the plurality of ring resonator type laser diodes are different from one another, an aspect where different lasing wavelengths are exhibited and an aspect where an identical lasing wavelength is exhibited can be realized properly in compliance with a desired setting.

More specifically, in the case where the individual ring resonator type laser diodes are formed with the different sorts of active layers so as to exhibit the lasing wavelengths different from one another, the ring resonator type laser diodes having different detection sensitivities for angular velocities can be formed on an identical substrate. In this case, the radii of the individual ring resonator type laser diodes may well be equal. It is therefore possible to facilitate conditions for fabrication at, for example, the deposition step and etching step of thin films constituting the diodes.

Besides, in the case where the individual ring resonator type laser diodes are formed with the different sorts of active layers so as to exhibit the identical lasing wavelength, an angular velocity can be detected by the plurality of laser diodes, and hence, an optical gyro of high reliability is obtained. In this case, the ring resonator type laser diodes having different detection sensitivities for angular velocities can also be formed on an identical substrate, by making the radii of the individual ring resonator type laser diodes different from each other, one another.

This embodiment has mentioned the example in which the individual ring resonator type laser diodes are respectively subjected to the constant-current drive so as to detect the voltages acting on the laser diodes. In this regard, the individual elements may be driven either with an identical constant current value or with different constant current values. It is also possible to adjust the rates (namely, proportion coefficients) of the frequency changes (Δω) of the voltages for an identical angular velocity (Ω), in such a way that internal lasing wavelengths are intentionally made different by injecting different current magnitudes. Of course, beats can be detected on the basis of changes in currents flowing through ring resonator type laser diodes, in such a way that the individual elements are formed separately from one another and that they are subjected to constant-voltage drive, not the constant-current drive. It is also possible to drive plural laser diodes with different voltage values, respectively. Further, an angular velocity can be found in such a way that a laser diode is subjected to the constant-voltage or constant-current drive and that a change in the impedance of the laser diode is directly detected by an impedance meter.

Figure 6:
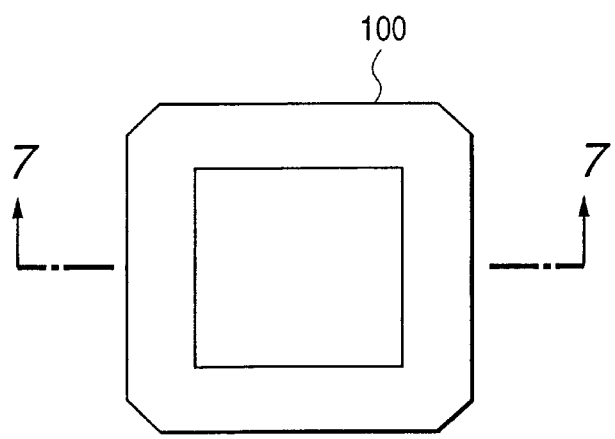
FIG. 6 is a top plan view of an example of a laser diode which constitutes a gyro according to the present invention.
Figure 7:
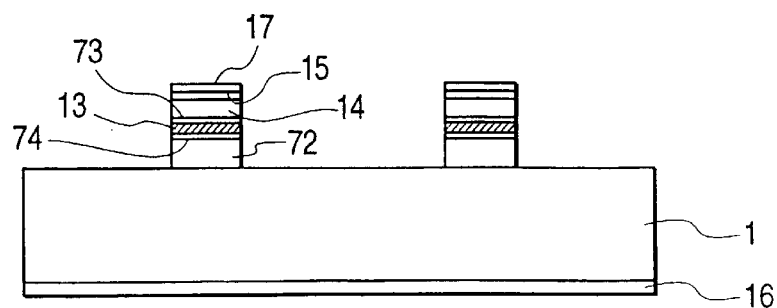
FIG. 7 is a sectional view of the laser diode shown in FIG. 6.

This embodiment has been described by mentioning the example in which the plurality of laser diodes are in the circular shape. However, a laser diode may well be in the shape of a polygon such as triangle or tetragon. Alternatively, it is allowed to employ a ring laser 100 of waveguide type which has a cylindrical structure as shown in FIG. 6. FIG. 6 is a top plan view of a laser diode. FIG. 7 illustrates the ring laser 100 in FIG. 6 as a sectional view taken along line 7—7. In FIG. 7, numeral 1 designates a substrate, numeral 13 an active layer, numerals 16 and 17 electrodes, numeral 15 a cap layer, numerals 14 and 72 clad layers, and numerals 73 and 74 optical guide layers. It is to be understood, however, that the construction of the laser diode is not restricted to the illustrated one.

Incidentally, although only one laser diode is shown in FIGS. 6 and 7, actually a gyro is constructed of two or more laser diodes, thereby to widen an angular-velocity detection range and to enhance a detection sensitivity.

An example of the concrete construction of the ring resonator type laser diode is as explained below. In FIG. 1, the semiconductor substrate 1 can be made of n-type InP, the buffer layer 12 on the front surface of the semiconductor substrate 1 can be made of n-type InP, the active layer 13 can be made of InGaAsP, the first clad layer 14 can be made of p-type InP, and the cap layer 15 can be made of p-type InGaAs.

By the way, a gyro may well be so constructed that terminals are individually connected to plural laser diodes, and that changes in the terminal voltages of the respective laser diodes are detected. Alternatively, a gyro may well be so constructed that one of plural laser diodes is subjected to constant-current drive so as to detect a voltage change attendant upon rotation, whereas another is subjected to constant-voltage drive so as to detect a current change. Of course, it is allowed to detect impedance changes, and to combine the three kinds of change detection means.

As illustrated in FIG. 1, the first, second and third ring resonator type laser diodes 2, 3 and 4 are so arranged that their constituent active layers may be separated from one another. They should preferably be spaced considering that their lights are prevented from coupling to one another. In this case, it is desirable that intervals of, at least, about 5 $\mu$m, more preferably at least 15 $\mu$m, are set in order to avoid the influence of evanescent light. Further, absorbers may well be formed among the ring resonator type laser diodes. Owing to the absorbers, it is permitted to relieve the mutual influences of leakage light etc. from the ring resonator type laser diodes. Incidentally, shield films may well be employed as the absorbers.

The active layer 13 may well consist of optical guide layers, and an active region for forming population inversion. The active region is endowed with, for example, a quantum well structure (having three quantum wells by way of example). Here, it is possible to employ as a well layer a layer of non-doped InGaAs which is 6 (nm) thick, and as a barrier layer a layer of InGaAsP (1.3 $\mu$m in terms of a wavelength corresponding to a band gap) which is 15 (nm) thick.

As the optical guide layers, layers of non-doped InGaAsP (1.15 $\mu$m in terms of a wavelength corresponding to a band gap), each of which is about 0.05 $\mu$m thick, are formed on both the sides of the active region. In this manner, the active layer 13 can have the construction in which the active region is sandwiched in between the two optical guide layers.

The device of the layer configuration explained above can be formed using techniques for forming the prior-art semiconductor laser, such as techniques for crystal growth, techniques for depositing films of dielectrics (for example, $SiN_x$ and $SiO_2$), semiconductor processing techniques (photolithography, etching, etc.), and electrode forming techniques. By way of example, steps for fabricating the device are as explained below:

(1) Crystal growth is executed on a semiconductor substrate so as to obtain the layer configuration shown in FIG. 2, by the existing crystal growth technique such as MOCVD (Metal Organic Chemical Vapor Deposition). Thus, an original wafer is prepared.

(2) Using the photolithographic technique, the original wafer is formed with a mask for etching (a resist or/and $SiN_x$ or the like may well be employed for the mask).

(3) The resulting original wafer is subjected to the etching (dry etching or/and wet etching) on the basis of the mask, thereby to obtain a substrate in a state where the original wafer is formed into the shape of a circular cylinder (of course, a structure in the shape of a polygonal column such as triangular pole, square pole or hexagonal pole may well be employed).

(4) Electrodes are formed on the side of the semiconductor substrate 1 and on the side of the cap layer 15, respectively.

(5) Thereafter, the electrodes are alloyed by a heat treatment. In this way, the device shown in FIG. 1, which includes the plurality of ring resonator type laser diodes each having the layer configuration shown in FIG. 2, is finished up.

If necessary, the semiconductor substrate to be used at the fabricating step (1) may be polished. It is also possible to employ reactive ion beam etching which uses chlorine gas or bromine gas.

Mentioned as examples of that material of the active layer which is applicable to the present invention are the systems of GaAs, InP, ZnSe, AlGaAs, InGaAsP, InGaAlP, InGaAsP, GaAsP, InGaAsSb, AlGaAsSb, InAsSbP, PbSnTe, GaN, GaAlN, InGaN, InAlGaN, GaInP, GaInAs, and SiGe.

Employable as the combinations of the active layer and the clad layer are, for example, PbSnTe (active layer)/PbSeTe (clad layer), PbSnSeTe (active layer)/PbSeTe (clad layer), PbEuSeTe (active layer)/PbEuSeTe (clad layer), PbEuSeTe (active layer)/PbTe (clad layer), InGaAsSb (active layer)/GaSb (clad layer), AlInAsSb (active layer)/GaSb (clad layer), InGaAsP (active layer)/InP (clad layer), AlGaAs (active layer)/AlGaAs (clad layer), and AlGaInP (active layer)/AlGaInP (clad layer).

Besides, regarding the structure of the semiconductor laser, the active layer is not restricted to a bulk structure, but it may well be a single quantum well (SQW) structure, a multiple quantum well (MQW) structure, or the like.

In case of employing a quantum well type laser, it is also favorable to adopt a deformed quantum well type structure. By way of example, the active layer is formed of eight quantum well layers of InGaAsP having a compressive strain of about 1 (%), and a barrier layer of InGaAsP.

It is a matter of course that an MIS (Metal Insulator Semiconductor) structure can be employed.

In addition, the substrate may be any substrate on which a desired material can be grown. It is possible to employ a substrate of any of compound semiconductors such as GaAs, InP, GaSb, InAs, PbTe, GaN, ZnSe and ZnS. Also employable is a substrate of any of SiC, 4H-SiC, 6H-SiC, sapphire, silicon, SOI (Silicon On Insulator), etc.

Employable for forming the active layer, etc. of the semiconductor laser are liquid phase epitaxy (LPE), molecular beam epitaxy (MBE), metal organic chemical vapor deposition or metal organic vapor-phase epitaxy (MOCVD or MOVPE), atomic layer epitaxy (ALE), metal organic molecular-beam epitaxy (MOMBE), chemical beam epitaxy (CBE), etc.

Usable for an anode electrode are Cr/Au, Ti/Pt/Au, AuZn/Ti/Pt/Au, etc. Usable for a cathode electrode are AuGe/Ni/Au, AuSn/Mo/Au, etc.

Although the materials of compositions constituting the laser diodes, etc. have been exemplified above, they are not restrictive as long as a gyro capable of demonstrating a desired performance can be fabricated.

By the way, in order to prevent the influence of the heat of the laser diodes, it is also favorable that the semiconductor laser chip is mounted on a heat radiating material (a heat sink). Cu, Si, SiC, AlN, diamond, etc. can be employed as the materials of the heat sink. Of course, the heat sink material is not restricted to these examples. Besides, if necessary, a Peltier element can be employed for temperature control.

Besides, an insulating film (a coating film) should preferably be formed on the side surface of the semiconductor laser (the side surface of a region where light exists) for such a purpose as reliably endowing the semiconductor laser with a total reflection surface or preventing the semiconductor laser from deteriorating. Employable as the coating material is, for example, an insulating film of $SiO_2$, SiN, $Al_2O_3$, $Si_3N_4$ or the like, amorphous silicon ($\alpha$-Si).

Incidentally, a gyro can also be constructed by combining the semiconductor device according to the present invention, with an optical fiber gyro or a vibration gyro.

EMBODIMENT 2

Figure 8:
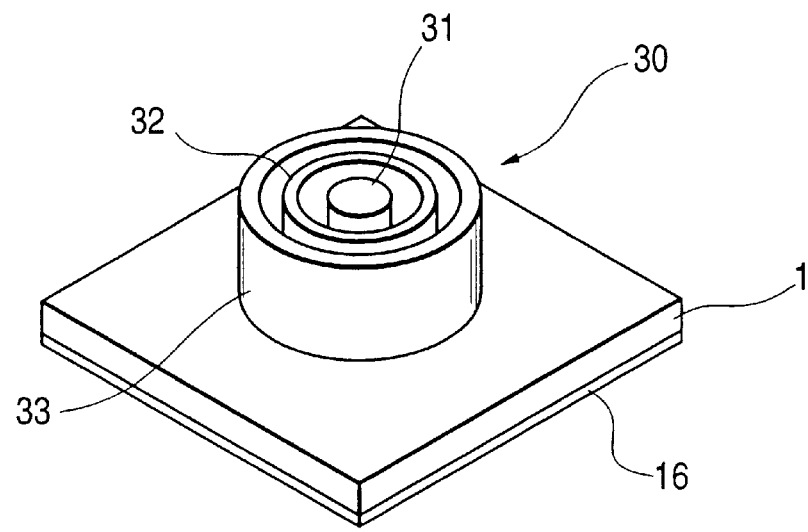
FIG. 8 is a perspective view showing another example of elements which constitute a gyro according to the present invention.

FIG. 8 is a perspective view showing another example of elements which constitute a gyro according to the present invention. It illustrates a case where plural ring resonator type laser diodes of different radii are arranged coaxially. In FIG. 8, the laser diodes are named "first, second and third ring resonator type laser diodes" successively from the laser diode of the smallest ring radius, and numerals 31, 32 and 33 are assigned to the respective ring resonator type laser diodes.

Figure 9:
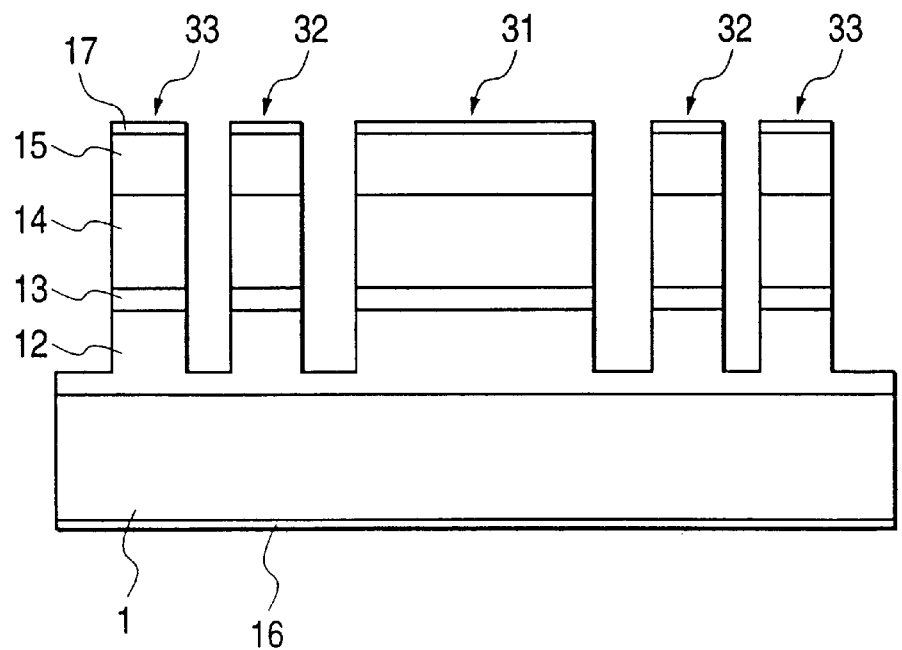
FIG. 9 is a schematic sectional view for explaining an example of the layer configuration of the plurality of ring resonator type laser diodes coaxially arranged as shown in FIG. 8.

FIG. 9 is a schematic sectional view for explaining an example of the layer configuration of the plurality of ring resonator type laser diodes 30 coaxially arranged as shown in FIG. 8. The basic structure of the gyro is the same as in the first embodiment (in FIG. 2). More specifically, referring to FIG. 9, numeral 1 designates a semiconductor substrate whose front surface is overlaid with a buffer layer (serving also as a clad layer) 12, an active layer 13, a first clad layer 14, and a cap layer 15. A first electrode 16 is formed on the rear surface of the semiconductor substrate 1, while a second electrode 17 is formed on the cap layer 15.

As shown in FIG. 9, the first, second and third ring resonator type laser diodes 31, 32 and 33 should desirably be spaced in order that lights emitted therefrom may not couple with one another. Concretely, they are spaced at intervals of at least 5 $\mu$m, preferably at least 15 $\mu$m.

The active layer 13 is configured of optical guide layers, and an active region for forming population inversion. Of course, the configuration is not especially restrictive.

The device of such a constitution is electrically connected as in the first embodiment (wired as shown in FIG. 4), whereby the individual ring resonator type laser diodes can detect the frequency changes (beat signals $\Delta\omega$) of voltages corresponding to an angular velocity $\Omega$(rad/s).

Since the operation of the ring resonator type laser diodes is essentially the same as in the first embodiment, it shall be briefly explained here.

The element itself is subjected to constant-current drive so as to detect the voltage change across the terminals, as described in the first embodiment. In each ring resonator type laser diode, under a steady state, counterclockwise and clockwise lights are formed independently, and both of them have an identical lasing frequency. As described in the first embodiment, when the element has undergone the angular velocity ($\Omega$(rad/s)), the wavelengths of the clockwise light and counterclockwise light change, respectively, and the voltage across the terminals changes at the frequency ($\Delta\omega$) of the difference between the lasing frequencies. The angular velocity can be known by measuring the difference frequency. Of course, the laser diode may well be subjected to constant-voltage drive so as to detect a change in a current flowing therethrough, or an impedance change may well be directly measured.

With the construction of this embodiment (in FIGS. 8 and 9), the size of the device can be further reduced in addition to the feature of the first embodiment (that the angular velocity range which can be detected by the combination with the detecting electric circuit widens).

By way of example, the layer configuration shown in FIG. 9 can be so formed that the semiconductor substrate 1 is comprised of n-type InP, that the buffer layer 12 is comprised of n-type InP, that the first clad layer 14 is comprised of p-type InP, and that the cap layer 15 is comprised of p-type InGaAs.

Incidentally, the active region is endowed with, for example, a quantum well structure (having three quantum wells by way of example). Here, it is possible to employ as a well layer a layer of non-doped InGaAs which is 6 nm thick, and as a barrier layer a layer of InGaAsP (1.3 $\mu$m in terms of a wavelength corresponding to a band gap) which is 15 nm thick. As the optical guide layers, layers of non-doped InGaAsP (1.15 $\mu$m in terms of a wavelength corresponding to a band gap), each of which is about 0.05 $\mu$m thick, are formed on both the sides of the active region. In this manner, the active layer 13 can have the construction in which the active region is sandwiched in between the two optical guide layers. Of course, the active layer may well have a bulk structure.

Needless to say, regarding the materials of the active layer, the substrate, etc., the method of forming the laser diodes, the electrodes, and so forth, those mentioned in the first embodiment can be employed.

EMBODIMENT 3

Figure 10:
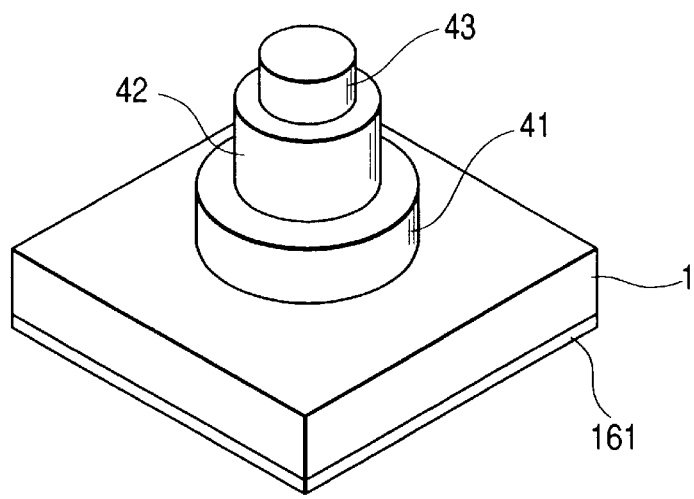
FIG. 10 is a perspective view showing another example of elements which constitute a gyro according to the present invention.

FIG. 10 is a perspective view showing another example of elements which constitute a gyro according to the present invention. This embodiment differs from the second embodiment in the point that, in the construction of FIG. 8 (where the ring resonator type laser diodes of different radii are arranged coaxially), a contrivance is made for relieving the optical coupling among the ring resonator type laser diodes. That is, in the construction of FIG. 10, the ring resonator type laser diodes are vertically stacked on a semiconductor substrate 1.

Referring to FIG. 10, numeral 41 designates a first ring resonator type laser diode, numeral 42 a second ring resonator type laser diode, and numeral 43 a third ring resonator type laser diode. Owing to such a construction, the leakage of light from the side surface of any of the ring resonator type laser diodes can be prevented from coupling with another and disturbing an operating state. Incidentally, numeral 161 indicates a first electrode.

Figure 11:
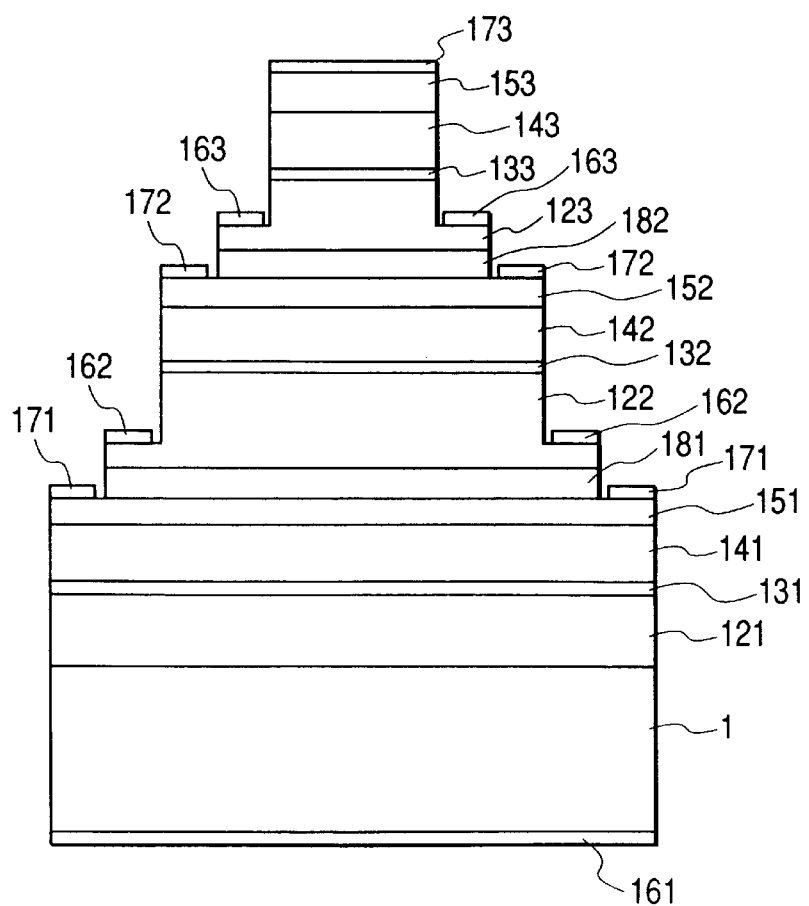
FIG. 11 is a schematic sectional view for explaining an example of the layer configuration of the plurality of ring resonator type laser diodes coaxially arranged and vertically stacked as shown in FIG. 10.

Such a construction necessitates a structure in which currents can be injected into the respective elements and in which voltage changes can be detected. FIG. 11 is a schematic sectional view for explaining an example of the layer configuration of the plurality of ring resonator type laser diodes coaxially arranged and vertically stacked as shown in FIG. 10.

In the example of FIG. 10, each of the ring resonator type laser diodes has substantially the same layer configuration as in the first or second embodiment, but this is not especially restrictive. A point of difference is that reverse bias layers are added in order to electrically isolate the individual elements.

The basic structure of the laser diodes can be made the same as in the first or second embodiment. Referring to FIG. 11, numeral 1 designates a semiconductor substrate; numeral 121, 122 and 123 buffer layers (serving also as clad layers); numeral 131, 132 and 133 active layers; numeral 141, 142 and 143 first clad layers; and numeral 151, 152 and 153 cap layers. Numerals 161, 162 and 163 indicate first electrodes which are formed at portions corresponding to the substrates of the respective ring resonator type laser diodes, while numerals 171, 172 and 173 indicate second electrodes which are formed on the cap layers 151, 152 and 153 of the respective ring resonator type laser diodes. The first ring resonator type laser diode 41 is constituted by the portions 161, 1, 121, 131, 141, 151 and 171, the second ring resonator type laser diode 42 is constituted by the portions 162, 122, 132, 142, 152 and 172, and the third ring resonator type laser diode 43 is constituted by the portions 163, 123, 133, 143, 153 and 173. Besides, numerals 181 and 182 denote the first and second reverse bias layers, respectively. By the way, it is possible to employ n-type InP for the semiconductor substrate, n-type InP for the buffer layers, p-type InP for the first clad layers, and p-type InGaAs for the cap layers. Of course, the materials exemplified in Embodiment 1 can also be employed.

Each of the reverse bias layers 181 and 182 is formed by a p-n junction. By way of example, a potential difference which has developed between the cap layer 151 of the first ring resonator type laser diode 41 and the buffer layer 122 of the second ring resonator type laser diode 42 falls into a reversebiased state with respect to the p-n junction of the reverse bias layer 181. Thus, a current is prevented from flowing between the cap layer 151 of the first ring resonator type laser diode 41 and the buffer layer 122 of the second ring resonator type laser diode 42.

In this manner, the electrical isolation between the respectively adjacent ring resonator type laser diodes can be realized by the reverse bias layers 181 and 182. Besides, in order to inject a current into each ring resonator type laser diode or to apply a voltage across it, a step is provided between the n-type clad layer and the p-type cap layer so that wire can be connected.

A substrate surface required for installing the plurality of ring resonator type laser diodes can be made smaller by forming the laser diodes coaxially with one another as shown in this embodiment. Therefore, the size of the whole device can be reduced. Moreover, the power consumption of the ring resonator type laser diode having the large radius can be suppressed low.

EMBODIMENT 4

Figure 12:
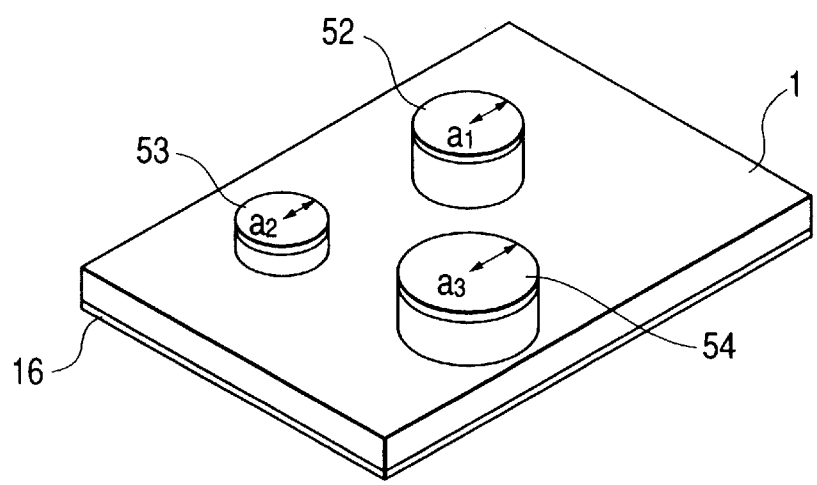
FIG. 12 is a perspective view showing another example of elements which constitute a gyro according to the present invention.

FIG. 12 is a perspective view showing another example of elements which constitute a gyro according to the present invention. This embodiment differs from Embodiment 1 in the point that, in disposing plural ring resonator type laser diodes on the identical surface of a single substrate, active layers which constitute the respective ring resonator type laser diodes are formed so as to differ in the peak wavelengths of gains (wavelengths of the largest gains).

This embodiment will be described concerning a case where the individual ring resonator type laser diodes have an identical ring radius in FIG. 12 and where their internal wavelengths are made different. More specifically, referring to FIG. 12, numeral 1 designates a semiconductor substrate. Numerals 52, 53 and 54 designate the first, second and third ring resonator type laser diodes of different ring radii ($a_i$ indicated in the figure: i=1, 2 and 3) formed on the semiconductor substrate 1. In this embodiment, however, the first ring resonator type laser diode 52, second ring resonator type laser diode 53 and third ring resonator type laser diode 54 have the identical ring radius, which shall be indicated by symbol $a_1$ here. Numeral 16 indicates a first electrode.

Figure 13:
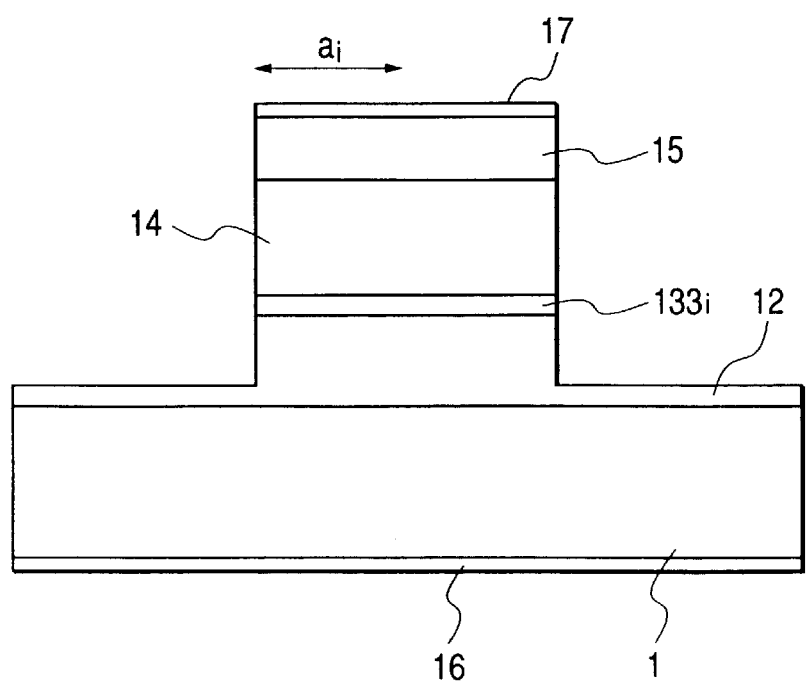
FIG. 13 is a schematic sectional view for explaining an example of the layer configuration of each of the ring resonator type laser diodes shown in FIG. 12.

FIG. 13 is a schematic sectional view for explaining an example of the layer configuration of each of the ring resonator type laser diodes shown in FIG. 12. Since all the ring resonator type laser diodes 52, 53 and 54 in FIG. 12 are formed by the same layer configuration except the active layers, the configuration shown in FIG. 13 is the construction of each of the first, second and third ring resonator type laser diodes. Referring to FIG. 13, symbol $a_i$ denotes the radius $a_1$, $a_2$ or $a_3$ of each laser diode shown in FIG. 12. Numeral 1 designates a semiconductor substrate which is made of n-type InP, and numeral 12 a buffer layer (serving also as a clad layer) which is made of n-type InP and which is formed on the front surface of the semiconductor 1. Symbol 133i denotes an active layer (where i=1, 2 and 3 which represent the active layers corresponding to the first, second and third ring resonator type laser diodes, respectively). A first clad layer 14 is made of p-type InP, and a cap layer 15 is made of p-type InGaAs. Numeral 16 designates a first electrode which is formed on the rear surface of the semiconductor substrate 1, while numeral 17 a second electrode which is formed on the cap layer 15.

As shown in FIG. 12, the first, second and third ring resonator type laser diodes 52, 53 and 54 should desirably be spaced in order that lights emitted therefrom may not couple with one another. Further, absorbers may well be formed among the ring resonator type laser diodes. Owing to the absorbers, it is permitted to relieve the mutual influences of leakage light etc. from the ring resonator type laser diodes. By way of example, it is possible to employ n-type InP for the semiconductor substrate, n-type InP for the buffer layer, p-type InP for the first clad layer, and p-type InGaAs for the cap layer. Of course, the materials exemplified in Embodiment 1 can also be employed.

The active layer $133_i$ consists of optical guide layers, and an active region for forming population inversion. The active region can be endowed with, for example, a quantum well structure. Here, quantum wells are so formed that the active layers $133_i$ which correspond to the first, second and third ring resonator type laser diodes 52, 53 and 54 exhibit the peak wavelengths of gains; $\lambda_1$ μm, $\lambda_2$ μm and $\lambda_3$ μm, respectively. Here, $\lambda_1 \ne \lambda_2$ and $\lambda_1 \ne \lambda_3$ hold. Concretely, $\lambda_1=1.55$, $\lambda_2=1.4$ and $\lambda_3=1.8$. Besides, as the optical guide layers, layers of non-doped InGaAsP (1.15 μm in terms of a wavelength corresponding to a band gap), each of which is about 0.05 μm thick, are formed on both the sides of the active region. That is, the construction in which the active region is sandwiched in between the two optical guide layers is expressed as the active layer $133_i$ in FIG. 13.

In case of actually using the elements of such a construction, the elements are constructed as shown in FIG. 3 in the first embodiment, and they are electrically connected by the method as shown in FIG. 4. Owing to such a construction, a constant current can be injected through the inductance L, and the change in the voltage between the first electrode 16 and the second electrode 17 can be detected through the capacitor C. The operation of the gyro can be executed by detecting the voltage changes under the influence of an angular velocity ($\Omega$) as explained in the first embodiment. The voltage change ($\Delta\omega$) conforms the formula explained in the first embodiment. As understood from the formula, different beat frequencies ($\Delta\omega$) can be outputted for the identical angular velocity ($\Omega$) irrespective of whether the radii of the rings are different or the wavelengths are different. In other words, since the active layers $133_i$ are different in the respective ring resonator laser diodes of the identical radius, the identical angular velocity ($\Omega$) can be brought into correspondence with the different frequency changes ($\Delta\omega$) of the voltages.

As a result, even in a case where the radii of the ring resonator type laser diodes are limited (there can be both an upper limit and a lower limit), the same effect as in the first embodiment can be attained by adjusting the wavelengths of the individual ring resonator type laser diodes.

EMBODIMENT 5

The fourth embodiment has mentioned the example in which the elements illustrated in FIGS. 12 and 13 have the identical ring radius and the different internal wavelengths. Conversely, even when a gyro is constructed of plural ring resonator type laser diodes which are endowed with an identical wavelength and different ring radii, the same effect can be attained.

This contrivance can be incarnated in such a way that the circumferential lengths of the rings are made different at integral times the identical wavelength, that conditions for injecting currents are made different for the respective ring resonator type laser diodes, or that the operating temperatures of the respective elements are made different.

Such a construction signifies to make different only either of two variables, namely, the wavelength and the ring radius, which affect the proportional coefficient between the angular velocity ($\Omega$) and the changes ($\Delta\omega$) of the voltages as indicated in the first embodiment. This brings forth the effect that the frequency component ($\Delta\omega$) of the voltage change to be obtained from a predetermined angular velocity ($\Omega$) can be fixed at the fabrication of the device. Owing to such a control, even when a device in which both the wavelength and the ring radius have become different have been fabricated, the relations between the angular velocity ($\Omega$) and the beat frequency ($\Delta\omega$) can be known before the device is operated.

EMBODIMENT 6

Figure 14:
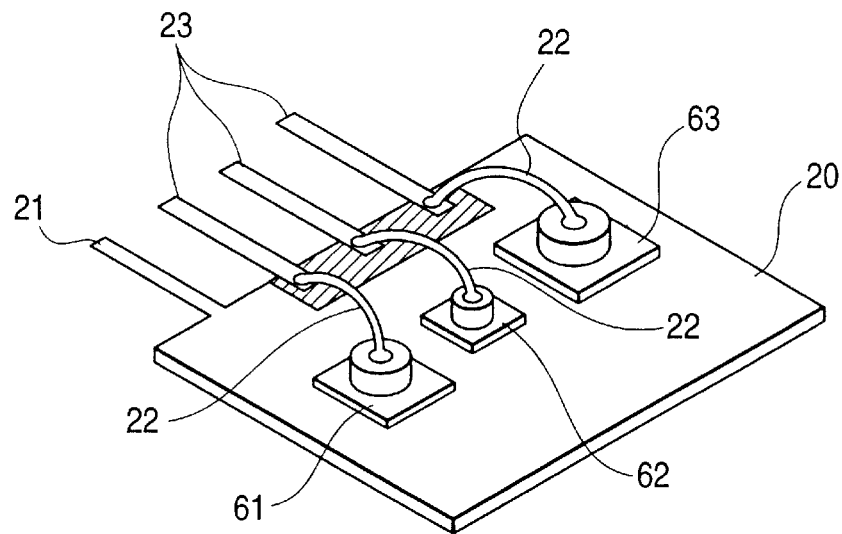
FIG. 14 is a perspective view showing another example of an optical gyro according to the present invention, showing a case where plural ring resonator type laser diodes, each of which undergoes a voltage change across predetermined terminals in attendance on the magnitude of an applied angular velocity when subjected to constant-current drive, are disposed in a single frame.
Figure 15:
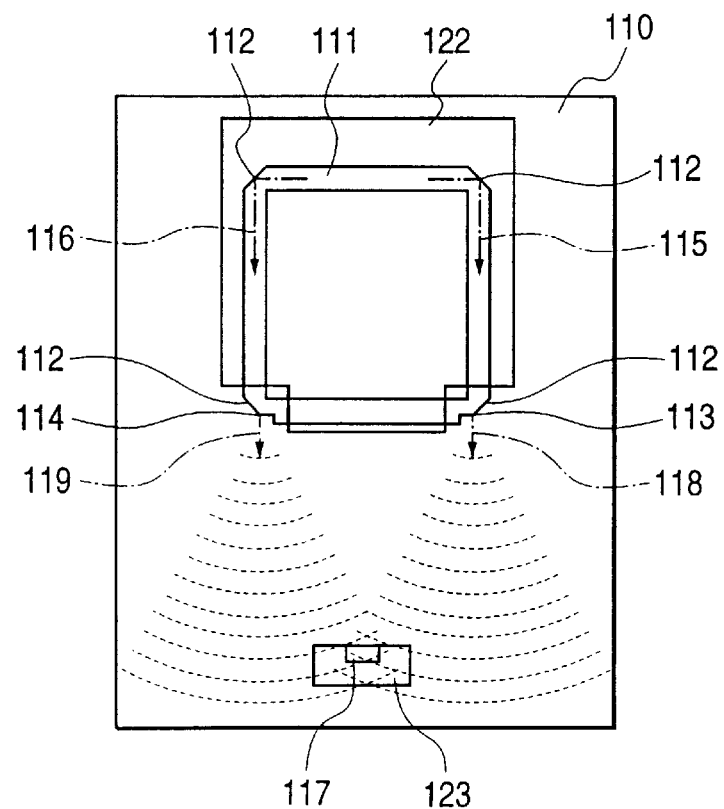
FIG. 15 is a top plan view of a ring resonator type laser gyro in the prior art.

FIG. 14 is a perspective view showing an example of an optical gyro according to the present invention. It shows a case where plural ring resonator type laser diodes, each of which undergoes a voltage change across predetermined terminals in attendance on the magnitude of an applied angular velocity when subjected to constant-current drive, are disposed in a single frame.

Referring to FIG. 14, numeral 20 designates a stem which is employed as the frame, numeral 21 a common electrode which is connected to the stem 20, numerals 61, 62 and 63 the ring resonator type laser diodes of different ring radii, numeral 23 electrodes which correspond to the respective elements of the ring resonator type laser diodes 61, 62 and 63, and numeral 22 pieces of wire which connect the corresponding electrodes 23 with the ring resonator type laser diodes 61, 62 and 63.

Here, each of the ring resonator type laser diodes 61, 62 and 63 of the different ring radii can be endowed with the same construction as that of the ring resonator type laser diode (in FIG. 2) explained in the first embodiment.

In the above construction, the substrate sides of the ring resonator type laser diodes 61, 62 and 63 are individually bonded to the stem 20 as a common electrode by the use of a solder. The electrodes on the cap layer sides of the respective ring resonator type laser diodes 61, 62 and 63 are connected to the individual electrodes 23 by the wire pieces 22.

The elements are connected as illustrated in FIG. 14 so that currents can be caused to flow through these elements. While the currents are being injected, changes in the voltages across the electrodes of the ring resonator type laser diodes are detected. Since the injection of the currents and the detection of the voltages are executed by the same electrodes, the device constructed of the capacitor and the inductance as shown in FIG. 4 can be employed.

The operation of the gyro is the same as that of the first embodiment. More specifically, each ring resonator type laser diode is subjected to constant-current drive, the frequencies (wavelengths) of clockwise light and counterclockwise light somewhat change within the element in accordance with an angular velocity ($\Omega$), and the voltage changes on the basis of the difference of the frequencies. The magnitude of the angular velocity can be measured by detecting the voltage change.

According to the above construction, the plurality of ring resonator type laser diodes are permitted to be hybrid-mounted within the single frame (for example, the stem or a case). On that occasion, the individual ring resonator type laser diodes are endowed with, for example, different ring radii, whereby they can have different detection sensitivities for angular velocities, so that an optical gyro whose detection sensitivity range is wider than in the prior art can be provided.

In the above, the case of employing the stem as the frame has been exemplified. The frame in the present invention, however, may be in any form as long as the plurality of ring resonator type laser diodes can be hybrid-mounted therein. By way of example, a case or the like may well be employed.

Besides, the ring resonator type laser diodes of the different ring radii have been explained above. Needless to say, however, the same effect can be expected even when, as stated before, the constructions of the active layers of the individual ring resonator type laser diodes are made different from one another so as to generate the identical lasing wavelength.

In the fifth embodiments thus far described, the materials of InP system have been exemplified as the materials which constitute the laser diodes. However, any other materials, such as GaAs, may well be used as long as they can form the semiconductor lasers.

Besides, the first embodiment and the third to fifth embodiments have indicated the disc as the shape of the ring resonator type laser diodes. Of course, however, the ring shape indicated in the second embodiment may well be applied. Further, the paths of lights need not be circular as long as they are adapted to revolve round.

The foregoing embodiments have mentioned the case where the constant-current drive is executed so as to detect the voltage changes corresponding to the angular velocity which act on the elements. In this regard, the elements can be dealt with so that the impedances of the elements are changed by the angular velocity acting on the elements during the drive. By way of example, accordingly, the change of the angular velocity can be detected by detecting current changes on the basis of constant-voltage drive. Also, when the impedance change has been found by any other method capable of detecting the change of the impedance, the change of the angular velocity can be measured.

Besides, the drive of the plurality of ring resonator type laser diodes or how to sense the angular velocity is not restricted to one sort, but different sorts may well be employed for the individual ring resonator type laser diodes.

As described above, according to the present invention, plural ring resonator type laser diodes of different sensitivities are disposed on a single substrate or in a single frame, whereby different voltage changes can be sensed for an identical angular velocity by the use of the respective ring resonator type laser diodes, so that a gyro whose detection range for angular velocities is wider than in the prior art can be provided.

What is claimed is:

1. A gyro, comprising:

a plurality of laser diodes;

detecting means for detecting a beat signal attendant on rotation indicating a change in current, a change in impedance, or a change in voltage of said laser diode; and a substrate supporting said plurality of laser diodes;

wherein at least two of said laser diodes are different from one another in rate of change in beat frequency versus change in angular velocity.

2. A gyro as defined in claim 1, wherein said laser diodes comprise active layers arranged separately from one another.

3. A gyro as defined in either of claims 1 and 2, wherein each of said laser diodes is a ring resonator type including lights that propagate circularly in opposite directions from each other.

4. A gyro as defined in either of claims 1 and 2, wherein said detecting means detects a beat signal indicating a change in a current flowing through each of said laser diodes, a change in a voltage developing across said each laser diode, and a change in an impedance of said each laser diode.

5. A gyro as defined in either of claims 1 and 2, wherein said detecting means detects a beat signal indicating a change in a voltage across terminals of said laser diodes, a change in a current flowing across said terminals, and a change in an impedance of each said laser diode.

6. A gyro as defined in claim 3, wherein said gyro is an optical gyro which includes said ring resonator type laser diodes.

7. A gyro as defined in either of claims 1 and 2, wherein said plurality of laser diodes comprises at least two sizes.

8. A gyro as defined in claim 7, wherein said laser diodes are different in size from one another.

9. A gyro as defined in either of claims 1 and 2, wherein plural laser diodes have at least two types of lasing wavelengths.

10. A gyro as defined in either of claims 1 and 2, wherein said plurality of laser diodes are formed on an identical surface of said substrate.

11. A gyro as defined in either of claims 1 and 2, wherein said plurality of laser diodes are formed coaxially with one another.

12. A gyro as defined in either of claims 1 and 2, wherein said detecting means detects a beat signal indicating a frequency change of a terminal voltage across corresponding terminals which are individually connected to said plurality of laser diodes.

13. A gyro as defined in claim 2, wherein said active layers in said plural laser diodes include at least two types of compositions.

14. A gyro as defined in claim 13, wherein said active layers are different in composition from one another.

15. A gyro as defined in claim 2, wherein said active layers in said plural laser diodes are identical in composition to one another.

16. A gyro as defined in either of claims 1 and 2, wherein lasing wavelengths of said plurality of laser diodes are different from one another.

17. A gyro as defined in claim 14, wherein said active layres are different in lasing wavelengths from one another.

18. A gyro as defined in claim 14, wherein said active layres are identical in lasing wavelengths to one another.

19. A gyro as defined in either of claims 1 and 2, wherein ring radii of said plurality laser diodes are identical to one another.

20. A gyro as defined in claim 1, wherein said plurality of laser diodes are arranged so as to be spaced at least 15 $\mu$m from one another.

21. A gyro as defined in either of claims 1 and 2, wherein said detecting means detects a beat signal indicating a change of frequency in a current flowing through each of said laser diodes, a change of frequency in a voltage developing across said each laser diode, and a change of frequency in an impedance of each said laser diode.

22. A semiconductor device, comprising:

a plurality of ring resonator type laser diodes, each of which undergoes a voltage change in attendance on a magnitude of an applied angular velocity when subjected to constant-current drive, and which are disposed in a single frame, wherein at least two of said laser diodes are different from one another in rate of change in beat frequency versus change in angular velocity.

23. A semiconductor device, comprising:

a plurality of ring resonator type laser diodes, each of which undergoes a change in a driving current in attendance on a magnitude of an applied angular velocity when subjected to constant-voltage drive, and which are disposed in a single frame, wherein at least two of said laser diodes are different from one another in rate of change in beat frequency versus change in angular velocity.

24. A semiconductor device, comprising:

a plurality of ring resonator type laser diodes, each of which undergoes a voltage change in attendance on a magnitude of an applied angular velocity when subjected to constant-current drive; and a single substrate on which said laser diodes are disposed, wherein at least two of said laser diodes are different from one another in rate of change in beat frequency versus change in angular velocity.

25. A semiconductor device, comprising:
a plurality of ring resonator type laser diodes, each of which undergoes a change in a driving current in on a magnitude of an applied angular velocity when subjected to constant-voltage drive; and
a single substrate on which laser diodes are disposed, wherein
at least two of said laser diodes are different from one another in rate of change in beat frequency versus change in angular velocity.

26. A semiconductor device as defined in either of claims 24 and 25, wherein said ring resonator type laser diodes are disposed on an identical surface of said single substrate.

27. The gyro according to claim 1, further comprising absorbers formed between said plurality laser diodes such that oscillated lights of each laser diode are not coupled with each other.

* * * * *

UNITED STATES PATENT AND TRADEMARK OFFICE
CERTIFICATE OF CORRECTION

PATENT NO.     : 6,304,329 B1
DATED          : October 16, 2001
INVENTOR(S)    : Jun Nitta et al.

It is certified that error appears in the above-identified patent and that said Letters Patent is hereby corrected as shown below:

Column 12,
Line 36, "133i" should read -- 133; --.

Column 16,
Line 24, "layres" should read -- layers --.
Line 26, "layres" should read -- layers --.

Column 17,
Line 3, "in on" should read -- in attendance on --.

Signed and Sealed this

Second Day of July, 2002

Attest:

JAMES E. ROGAN
Attesting Officer        Director of the United States Patent and Trademark Office